(12) United States Patent
Otani

(10) Patent No.: US 6,585,354 B2
(45) Date of Patent: Jul. 1, 2003

(54) IMAGE PRINTING APPARATUS AND METHOD

(75) Inventor: Tsuyoshi Otani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/084,354

(22) Filed: Feb. 28, 2002

(65) Prior Publication Data

US 2002/0126163 A1 Sep. 12, 2002

(30) Foreign Application Priority Data

Mar. 1, 2001 (JP) ........................................ 2001-056896

(51) Int. Cl.$^7$ ............................................... B41J 2/21
(52) U.S. Cl. ............................. 347/43; 347/15; 347/14; 358/1.16
(58) Field of Search ............................ 347/43, 15, 14, 347/19, 57; 358/1.17, 1.16; 395/115

(56) References Cited

U.S. PATENT DOCUMENTS

| 4,313,124 A | 1/1982 | Hara ............................. 347/57 |
| 4,345,262 A | 8/1982 | Shirato et al. ................. 347/10 |
| 4,459,600 A | 7/1984 | Sato et al. ..................... 347/47 |
| 4,463,359 A | 7/1984 | Ayata et al. ................... 347/56 |
| 4,558,333 A | 12/1985 | Sugitani et al. ............... 347/65 |
| 4,608,577 A | 8/1986 | Hori ............................. 347/66 |
| 4,723,129 A | 2/1988 | Endo et al. .................... 347/56 |
| 4,740,796 A | 4/1988 | Endo et al. .................... 347/56 |
| 6,260,946 B1 * | 7/2001 | Hori ............................. 347/41 |
| 6,449,058 B1 * | 9/2002 | Ueda ........................... 358/1.16 |
| 6,456,389 B1 * | 9/2002 | Pan et al. ................... 358/1.17 |

FOREIGN PATENT DOCUMENTS

| JP | 59-123670 | 7/1984 |
| JP | 59-138461 | 8/1984 |
| JP | 60-71260 | 4/1985 |
| JP | 54-56847 | 5/1989 |

* cited by examiner

*Primary Examiner*—Lamson D Nguyen
(74) *Attorney, Agent, or Firm*—Fitzpatrick, Cella, Harper & Scinto

(57) ABSTRACT

An image printing apparatus and method capable of preventing any smearing that occurs in printing at the same landing position using nozzles of different colors with a smaller RAM capacity are provided. For this purpose, for example, to prevent any ink smearing that occurs when K (black) ink and color ink are printed at the same landing point, K data in raster data transferred in accordance with the order of drive of the printing elements of a printing head is temporarily stored. In printing color data on the same raster, it is determined whether color data to be printed at the same landing point as that of the K data in the temporary storage area is present. If such data is present, smearing preventing processing is performed. In this way, any smearing between the K (black) ink and color ink can be prevented.

20 Claims, 7 Drawing Sheets

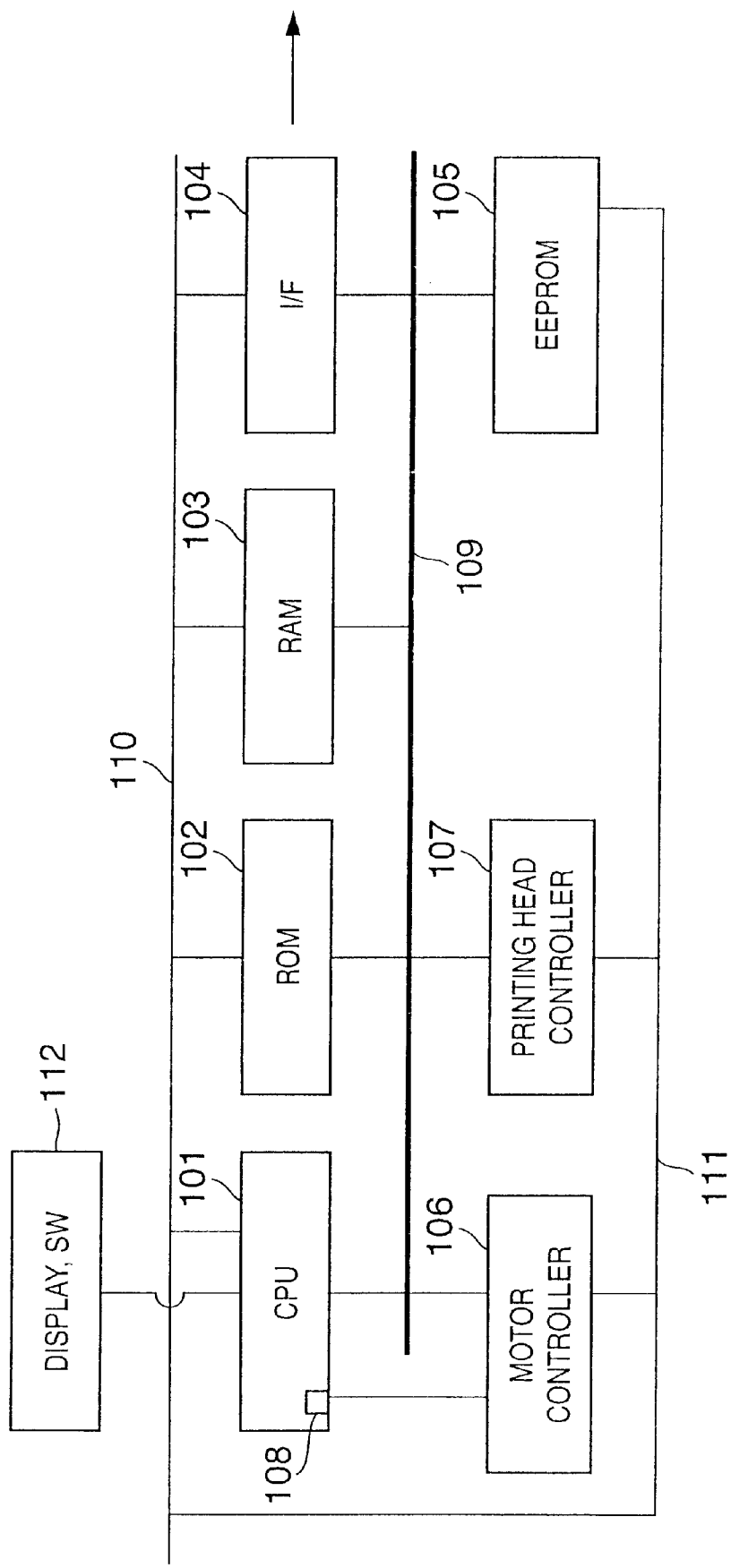

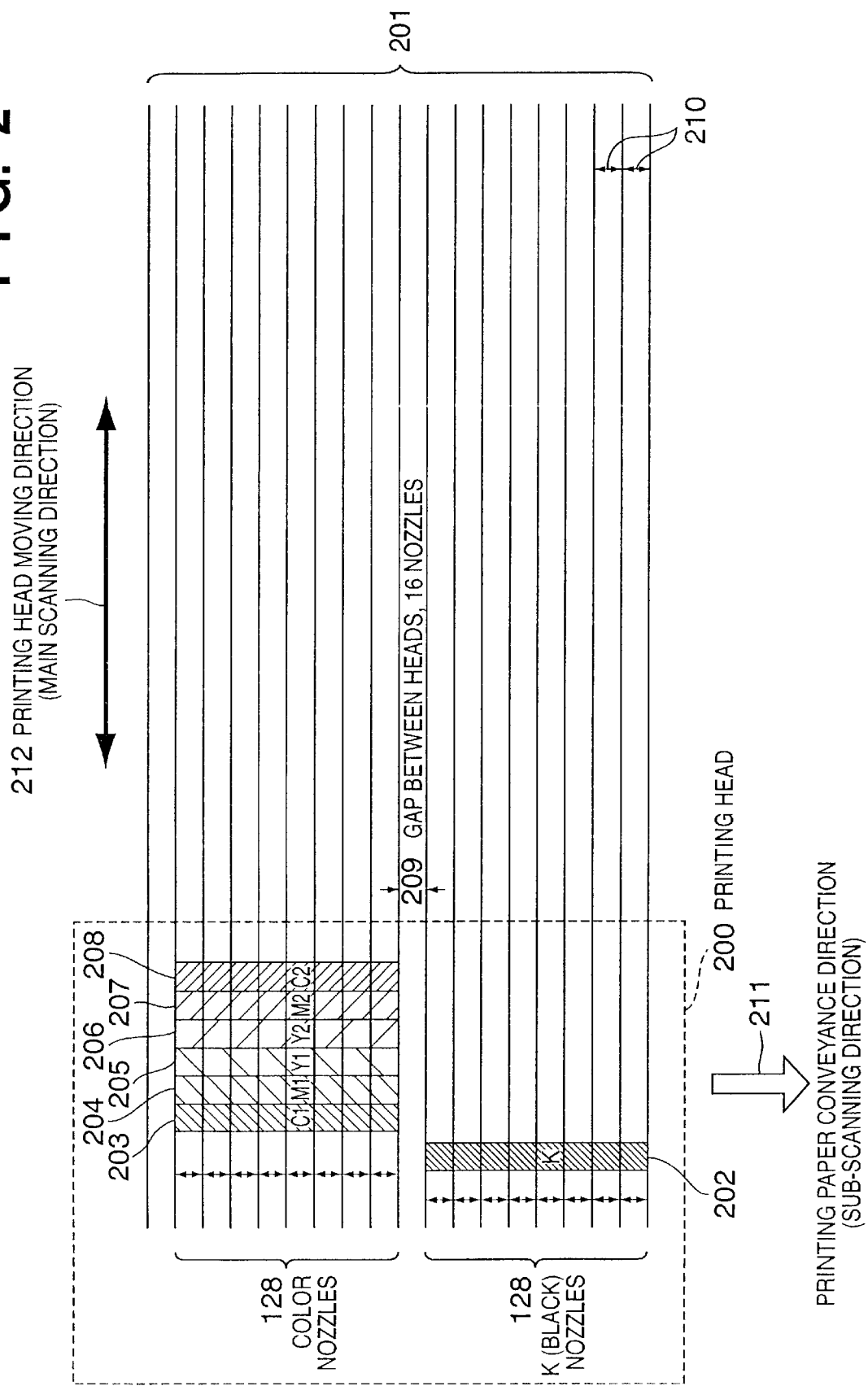

PRINTING PAPER CONVEYANCE DIRECTION
(SUB-SCANNING DIRECTION)

IMAGE PRINTING APPARATUS AND METHOD

FIELD OF THE INVENTION

The present invention relates to an image printing apparatus and method using a printing head having a K (black) nozzle array and color nozzle array, which are shifted in the sub-scanning direction and, more particularly, to an image printing apparatus and method which prevent ink smearing generated when K (black) ink and color ink are discharged to land on the same landing point, and a storage medium.

BACKGROUND OF THE INVENTION

As an information output apparatus in, e.g., a wordprocessor, personal computer, or facsimile apparatus, a printer for printing desired information such as characters or images on a sheet-shaped printing medium such as a paper sheet or film is used.

Various printing schemes are known as the printing scheme of a printer. In recent years, an ink-jet scheme has particularly received a great deal attention because noncontact printing on a printing medium such as a paper sheet is possible, color printing is easy, and it is silent. As its construction, a serial printing scheme is generally widely used because it is inexpensive and allows easy size reduction. This scheme prints by attaching a printing head for discharging ink in accordance with desired print information and reciprocally scanning the printing head in a direction perpendicular to the feeding direction of a printing medium such as a paper sheet.

Conventionally, in an image printing apparatus using a printing head in which K (black) nozzles and color nozzles are shifted in the sub-scanning direction (printing paper conveyance direction), print data transferred for each raster must be temporarily stored in a drawing (writing) buffer and continuously stored until printing corresponding to each nozzle is done.

For example, for a printing head constructed by K (black) and color nozzles (C1 (dark cyan), C2 (light cyan), M1 (dark magenta), M2 (light magenta), Y1 (dark yellow), and Y2 (light yellow)) comprising 128 nozzles for each color, normally, the color nozzles are shifted from the K (black) nozzles by (the number of K (black) nozzles +$\alpha$) or more so as not to print any color in the next pass after printing K (black).

Here, the value $\alpha$ depends on the management amount of a divided printing buffer. If the printing buffer is managed in blocks of 16 bits, the shift amount further increases by 16 rasters, so the total shift amount is 128+16=144 rasters. When data transferred for each raster is received, printing is executed while checking whether smearing can occur at the same landing position.

However, the print data is transferred for each raster. For this reason, to draw raster data for the first K (black) nozzle, data corresponding to (128+16 +128) rasters must be prepared for each color nozzle from the 128th nozzle of the head. This requires a large RAM capacity.

In another scheme, data corresponding to only a printing portion of the head having a shift in advance is transferred to reduce the RAM capacity. In this scheme, it cannot be checked whether data is present at the same landing position because data on the same raster is not transferred. As a result, if data is present at the same landing position, smearing occurs in printing by the K (black) nozzles and color nozzles.

SUMMARY OF THE INVENTION

The present invention has been made to solve the problems of the prior art, and has as its object to provide an image printing apparatus and method capable of preventing any smearing that occurs in printing at the same landing position using nozzles of different colors with a smaller RAM capacity.

In order to achieve the above object, an image printing apparatus according to an aspect of the present invention has the following arrangement. The image printing apparatus which causes a carriage having, for each of a plurality of inks, a printing head having a plurality of printing elements arrayed in a predetermined direction to scan on a printing medium in a direction perpendicular to the array direction of the printing elements, thereby forming a color image on the printing medium, comprising a reception buffer for storing print data transmitted in a raster format, printing buffers for divisionally storing the data stored in the reception buffer for each ink and for each predetermined area to be printed by the printing head, determination means for determining whether a designated printing buffer and an undesignated printing buffer in the printing buffers have data to be printed at the same position, and preventing means for, when it is determined that the data to be printed at the same position are present, preventing any ink smearing that occurs in printing at the same position.

For example, the plurality of divided printing buffers have information of different inks to form the color image and information of a distance between the inks.

For example, the designated printing buffer comprises printing buffers for a plurality of kinds of ink.

For example, the designated printing buffer comprises a printing buffer for K (black) ink and printing buffers for inks other than the K (black) ink.

For example, the determination means compares data representing whether each position is to be printed, which are stored in the designated printing buffer and the printing buffers other than the designated printing buffer, and when the data to be printed at the same position are present, sets a flag indicating that the data indicate the same position.

For example, the preventing means prevents the ink smearing by changing a timing of printing using each ink.

For example, the preventing means prevents the ink smearing by changing a timing of printing in continuously printing using ink other than the K (black) ink at the same position where printing has been executed using the K (black) ink of the inks.

For example, the printing head comprises an ink-jet printing head which prints by discharging ink.

For example, the printing head comprises a printing head which discharges ink using a thermal energy and has a thermal energy transducer for generating thermal energy to be applied to the ink.

In order to achieve the above object, an image printing method according to another aspect of the present invention has the following arrangement. An image printing method using an image printing apparatus which causes a carriage having, for each of a plurality of inks, a printing head having a plurality of printing elements arrayed in a predetermined direction to scan on a printing medium in a direction perpendicular to the array direction of the printing elements, thereby forming a color image on the printing medium, the image printing apparatus comprises a reception buffer for storing print data transmitted in a raster format, and printing buffers for divisionally storing the data stored in the reception buffer for each ink and for each predetermined area to be printed by the printing head, and the method comprises the determination step of determining whether a designated printing buffer and an undesignated printing buffer in the printing buffers have data to be printed at the same position, and the preventing step of, when it is determined that the data to be printed at the same position are present, preventing any ink smearing that occurs in printing at the same position.

In order to achieve the above object, a computer-readable storage medium according to still another aspect of the present invention has the following arrangement. A control program which controls an image printing method using an image printing apparatus which causes a carriage having, for each of a plurality of inks, a printing head having a plurality of printing elements arrayed in a predetermined direction to scan on a printing medium in a direction perpendicular to the array direction of the printing elements, thereby forming a color image on the printing medium, the image printing apparatus comprises: a reception buffer for storing print data transmitted in a raster format; and printing buffers for divisionally storing the data stored in the reception buffer for each ink and for each predetermined area to be printed by the printing head; and the control method comprises: a code of the determination step of determining whether a designated printing buffer and an undesignated printing buffer in the printing buffers have data to be printed at the same position; and a code of the preventing step of, when it is determined that the data to be printed at the same position are present, preventing any ink smearing that occurs in printing at the same position.

In order to achieve the above object, a computer-readable storage medium according to still another aspect of the present invention has the following arrangement. A computer-readable storage medium storing a control program which controls an image printing method using an image printing apparatus which causes a carriage having, for each of a plurality of inks, a printing head having a plurality of printing elements arrayed in a predetermined direction to scan on a printing medium in a direction perpendicular to the array direction of the printing elements, thereby forming a color image on the printing medium, the image printing apparatus comprises: a reception buffer for storing print data transmitted in a raster format; and printing buffers for divisionally storing the data stored in the reception buffer for each ink and for each predetermined area to be printed by the printing head; and the control method comprises: a code of the determination step of determining whether a designated printing buffer and an undesignated printing buffer in the printing buffers have data to be printed at the same position; and a code of the preventing step of, when it is determined that the data to be printed at the same position are present, preventing any ink smearing that occurs in printing at the same position.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing a control arrangement for executing printing control of an ink-jet printing apparatus according to an embodiment of the present invention;

FIG. 2 is a view for explaining a printing head according to the embodiment;

DETAILED DESCRIPTION OF THE PREFERRED EMBODIMENTS

Preferred embodiments of the present invention will now be described in detail in accordance with the accompanying drawings.

An embodiment of the present invention will be described below with reference to the accompanying drawings.

In this embodiment, a method of preventing any ink smearing will be explained by exemplifying an ink-jet printing apparatus 100 as an image printing apparatus. However, the present invention is not limited to the mentioned example.

An ink smearing preventing method when K (black) ink and color ink are discharged to land on the same landing point will be described below as an example.

In the ink smearing preventing method of this embodiment, K (black) data transferred in a form corresponding to the printing head shape is temporarily stored in a predetermined buffer. In printing color data on the same raster it is determined whether color data to be printed at the same landing point as that of the temporarily stored K (black) data is present. If the color data to be printed at the same landing point as that of the K (black) data is present, smearing preventing processing is executed to prevent any ink smearing.

Brief Description of a Printing Apparatus

Figure 5:
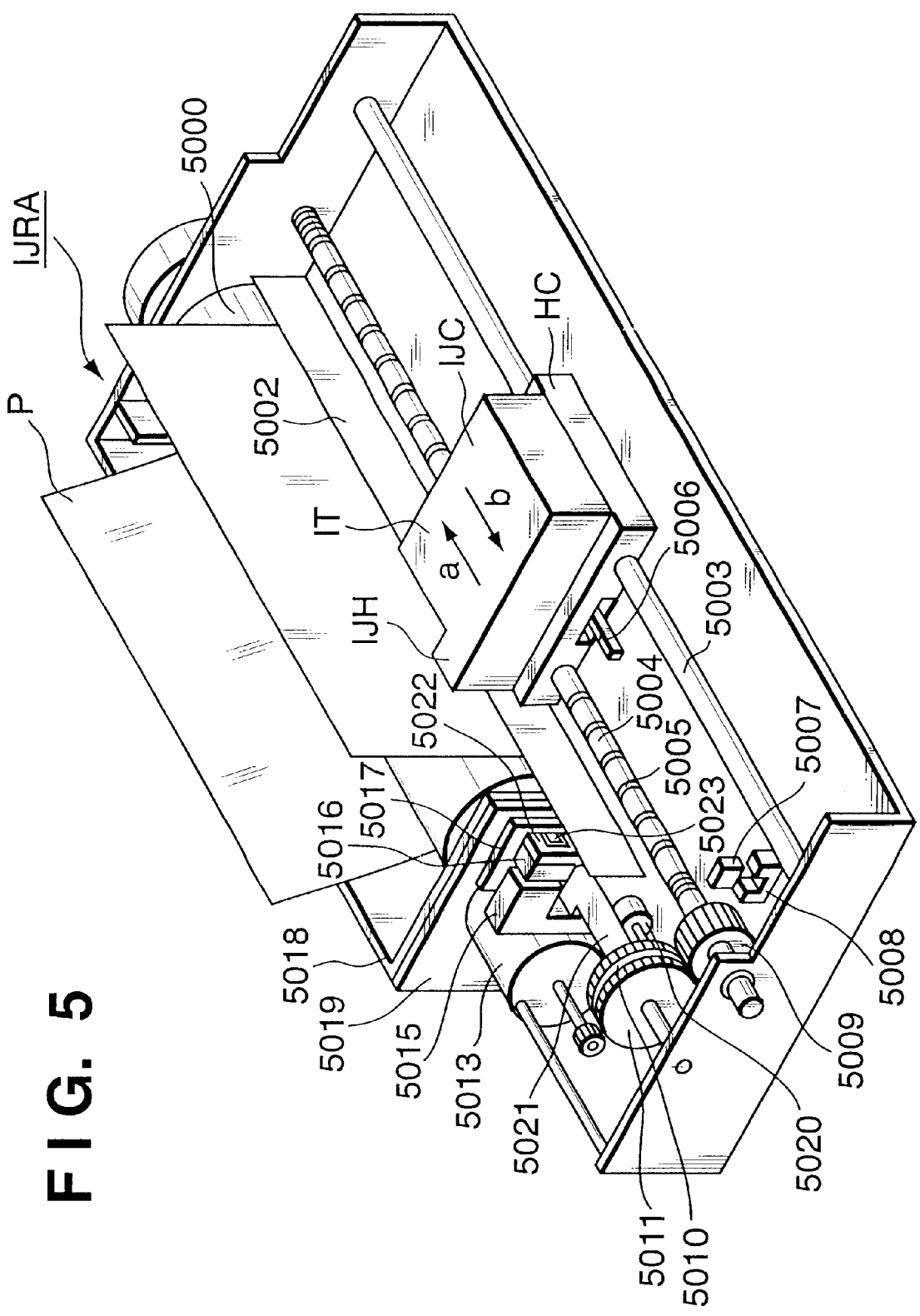
FIG. 5 is a perspective view showing the outer appearance of the ink-jet printing apparatus according to the embodiment of the present invention.

FIG. 5 is a perspective view showing the outer appearance of an ink-jet printer 100 as a typical embodiment of the present invention.

Referring to FIG. 5, a carriage HC engages with a spiral groove 5004 of a lead screw 5005, which rotates via driving force transmission gears 5009 to 5011 upon forward/reverse rotation of a drive motor 5013. The carriage HC has a pin (not shown), and is reciprocally moved in directions of arrows a and b in FIG. 5.

An integrated ink-jet cartridge IJC which incorporates a printing head IJH and an ink tank IT is mounted on the carriage HC.

Reference numeral 5002 denotes a sheet pressing plate, which presses a paper sheet against a platen 5000, ranging from one end to the other end of the scanning path of the carriage.

Reference numerals 5007 and 5008 denote photocouplers which serve as a home position detector for recognizing the presence of a lever 5006 of the carriage in a corresponding region, and used for switching, e.g., the rotating direction of motor 5013.

Reference numeral 5016 denotes a member for supporting a cap member 5022, which caps the front surface of the printing head IJH; and 5015, a suction device for sucking ink residue through the interior of the cap member. The suction device 5015 performs suction recovery of the printing head via an opening 5023 of the cap member 5015.

Reference numeral 5017 denotes a cleaning blade; 5019, a member which allows the blade to be movable in the back-and-forth direction of the blade. These members are supported on a main unit support plate 5018. The shape of the blade is not limited to this, but a known cleaning blade can be used in this embodiment.

Reference numeral 5021 denotes a lever for initiating a suction operation in the suction recovery operation. The lever 5021 moves upon movement of a cam 5020, which engages with the carriage, and receives a driving force from the driving motor via a known transmission mechanism such as clutch switching.

The capping, cleaning, and suction recovery operations are performed at their corresponding positions upon operation of the lead screw 5005 when the carriage reaches the home-position side region. However, the present invention is not limited to this arrangement as long as desired operations are performed at known timings.

Description of Control Arrangement

A control arrangement for executing printing control of the ink-jet printing apparatus 100 will be described next with reference to FIG. 1.

A CPU 101 is an arithmetic device for creating print data of the ink-jet printing apparatus 100, driving a motor for printing control, controlling printing head discharge, analyzing a command transferred from a host unit, and executing various kinds of setting by input from a panel.

A ROM 102 stores a printer control program, various kinds of data, font data to be used for print data, and the like. The control program stored in the ROM 102 is read out and executed by the CPU 101.

Various kinds of data loaded in the ink-jet printing apparatus 100 in advance include data that are directly used as initial values and data that are rasterized on a RAM 103 and processed and used by the CPU 101. For font data that is designated as needed, the CPU 101 accesses and reads out font data loaded in advance. The font data is rasterized on the RAM 103 into print data and used.

The number of loaded font data or the types of loaded characters change depending on the model of the ink-jet printing apparatus, and therefore, their storage capacity also changes. In the ink-jet printing apparatus 100 of this embodiment, the Ming-style font will be exemplified.

On the RAM 103, a result obtained by modifying the above-described font by a designated modification method is rasterized and used as print data.

Image data loaded by the CPU 101 is also rasterized on the RAM 103 in correspondence with a designated printing position and used as print data.

The RAM 103 is also used as a work memory necessary for execution of the control program or a reception buffer serving as a temporary storage area of input data from an I/F 104.

The I/F 104 is connected to a host unit (not shown) to receive various kinds of data such as print data or a print instruction command from the host unit (not shown).

The I/F 104 of this embodiment has electrical specifications complying with IEEE-1284. The I/F is capable of bidirectional communication because it not only receives data from the host unit (not shown) but also transfers a printer status to the host unit (not shown).

An EEPROM 105 stores the number of printed papers, the remaining ink amount, and the like as well as printer set status data. As the printer set status data, e.g., data such as a font type, usable paper, and function items such as automatic power ON/OFF are stored as information.

The ink-jet printing apparatus 100 of this embodiment is a printer which prints by scanning the printing head in the main scanning direction. Hence, a motor controller 106 is used for control to print by scanning the printing head once or a plurality of number of times.

The motor controller 106 is controlled by the CPU 101. Printing is executed using the uniform speed region of the first motor for head scanning. As another control by the motor controller 106, a line feed motor controller used to control the second motor for moving a paper sheet in the feeding direction is controlled.

The second motor can operate independently of the first motor for head scanning. In normal printing, after the first motor for head scanning scans once or a plurality of number of times, the line feed motor controller controls feeding a paper sheet by a predetermined amount.

In this embodiment, the apparatus has a pickup motor for paper feed. A printing paper sheet conveyed from a feed port is conveyed by a pickup motor controller to a predetermined position to which the drive of the line feed motor is transmitted. A printing head controller 107 performs heat processing of the printing section of the printing head, head maintenance control, and ink amount detection (to be described in detail with reference to FIG. 2).

An A/D converter 108 in the CPU 101 has a function of converting data into an 8-bit value at about 5 $\mu$sec at a time. A bus line 109 comprises data and address buses for transferring data. The CPU 101 controls the units 102 to 108 using the bus line 109.

Reference numerals 110 and 111 denote power supply lines to the respective units; and 112, a display panel arranged at the upper portion of the main body of the ink-jet printing apparatus 100. The display panel has a power key, a resume key for designating recovery, test printing and recovery from an error, and LEDs for indicating data reception and power status.

In this example, the control program to be executed by the CPU 101 is stored in the ROM 102. However, an erasable/writable storage medium such as an EEPROM may be added such that the control program can be changed from a host computer connected to the ink-jet printing apparatus 100.

As described above, an ink tank IT and printing head IJH may be integrated to form an exchangeable ink-jet cartridge IJC. Alternatively, the ink tank IT and printing head IJH may be separately arranged such that only the ink tank IT can be exchanged if ink runs out.

Printing Head

FIG. 2 is a view for explaining the structure of a printing head 200 according to this embodiment. Reference numerals 201 denote a plurality of lines for explaining the operation of the printing head 200. An interval 210 between the lines corresponds to the width of 16 nozzles of the printing head.

Reference numeral 211 denotes a printing paper conveyance direction (sub-scanning direction); and 212, a moving direction (main scanning direction) of the printing head 200.

K (black) nozzles 202 comprise 128 nozzles at 600 dpi.

Reference numerals 203 to 208 denote color nozzles. The color nozzles of this embodiment comprise 128 light cyan (C1) nozzles 203, 128 light magenta nozzles (M1) 204, 128 light yellow (Y1) nozzles 205, 128 dark yellow (Y2) nozzles 206, 128 dark magenta nozzles (M2) 207, and 128 dark cyan (C2) nozzles 208. Each ink color has two types, light and dark, so that 128 nozzles are prepared for each of the total of six colors.

Reference numeral 209 denotes a gap between the K (black) head and the color head. The gap 209 can take an arbitrary value. In this embodiment, the gap 209 corresponds to 16 nozzles for 1 band buffer for the purpose of management.

Use Method of Printing Buffer for Drawing/Rasterization and Printing

Figure 3A:
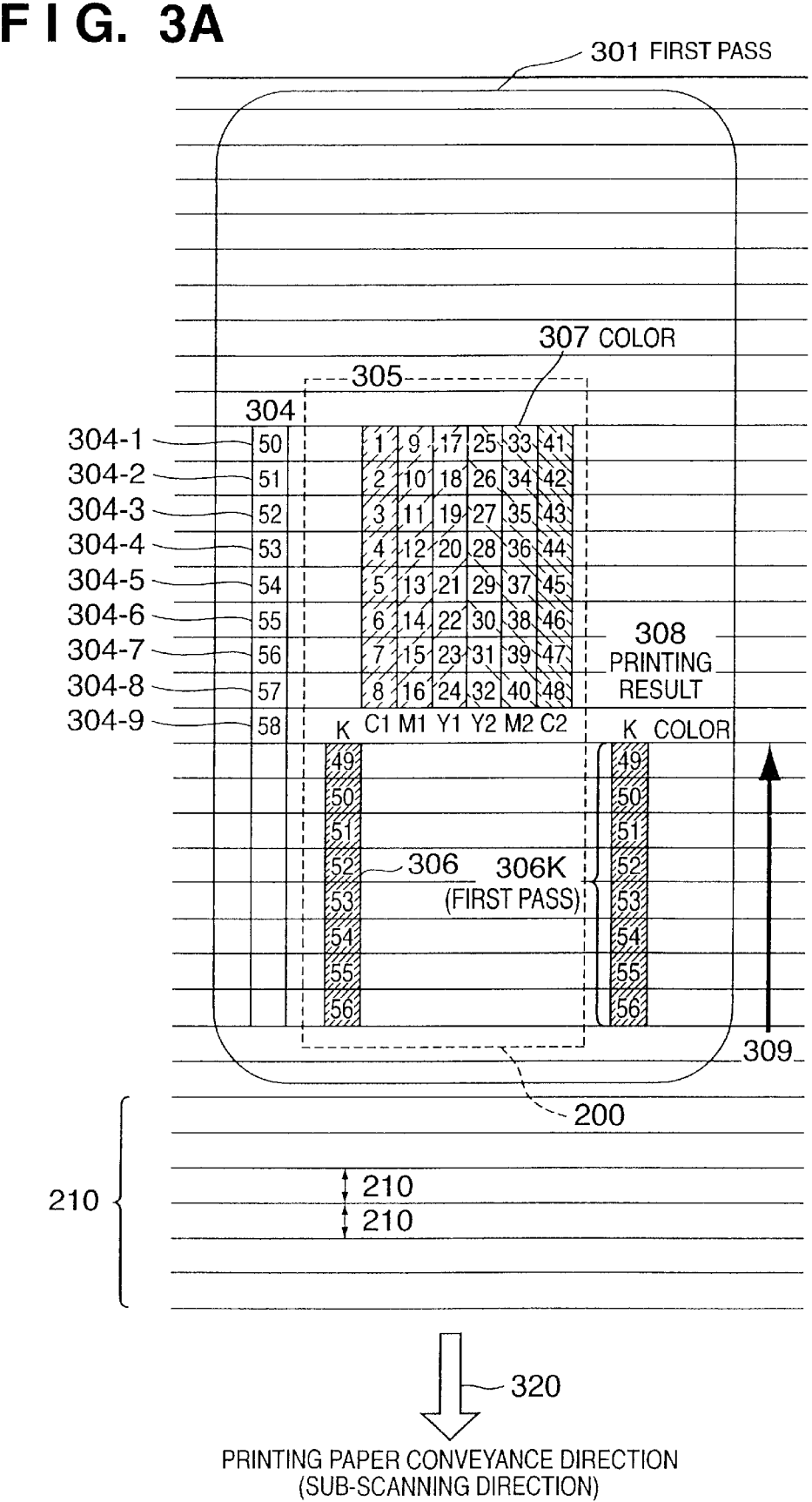
FIG. 3A is a view for explaining the use method and printing result of the printing buffer for drawing/rasterization and printing in the first pass.
Figure 3B:
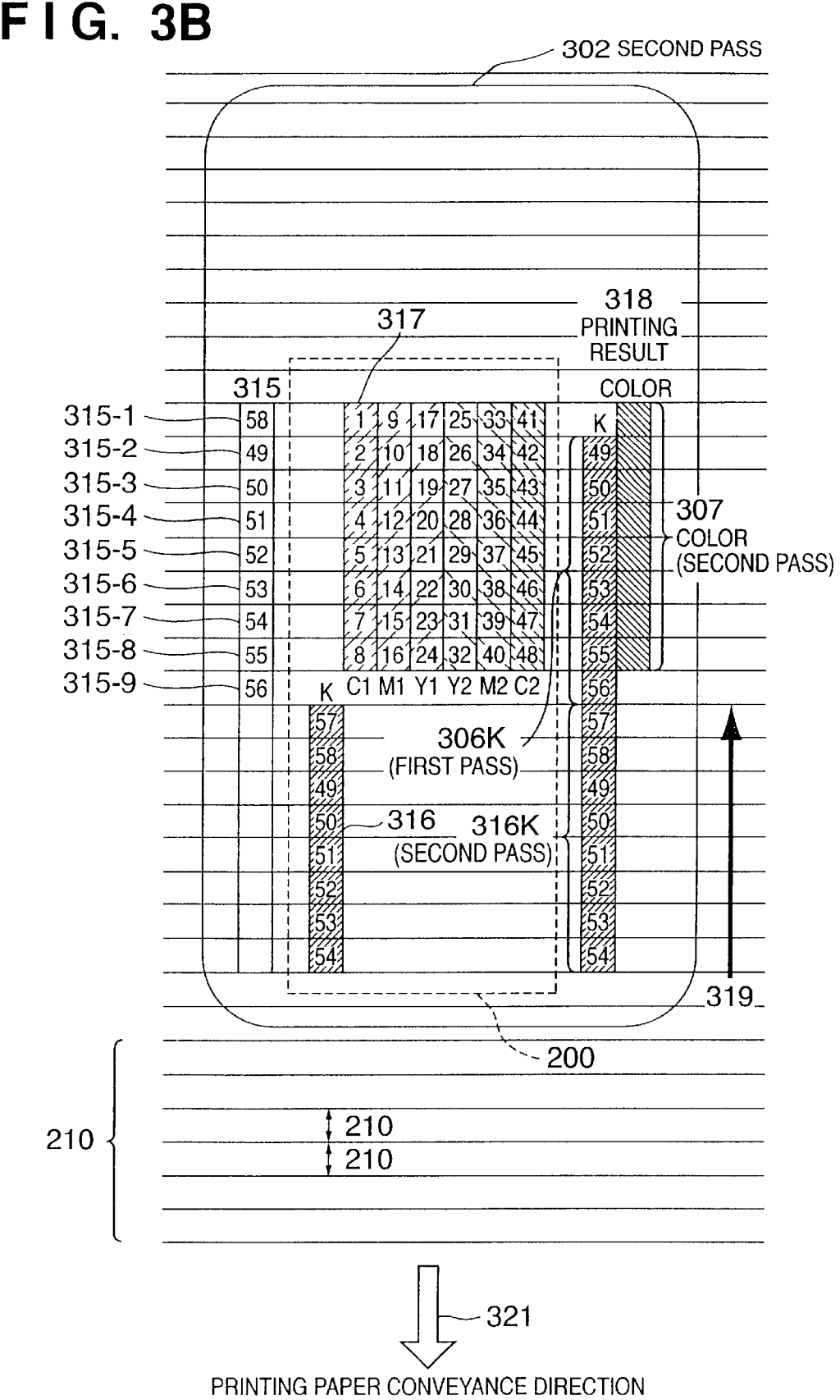
FIG. 3B is a view for explaining the use method and printing result of the printing buffer for drawing/rasterization and printing in the second pass.
Figure 3C:
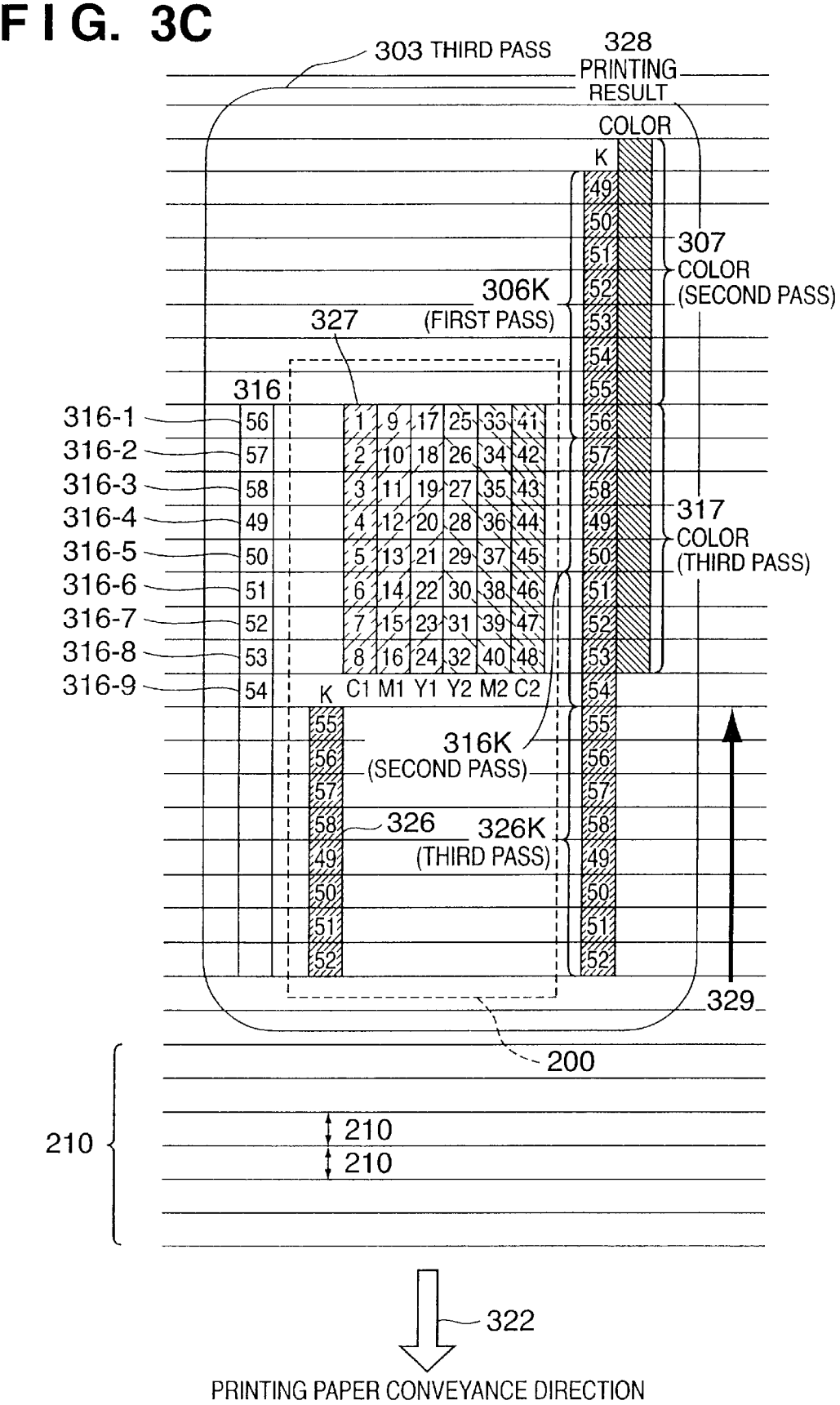
FIG. 3C is a view for explaining the use method and printing result of a printing buffer for drawing/rasterization and printing in the third pass.

FIGS. 3A to 3C are views for explaining the use method of a printing buffer for actual drawing/rasterization and printing. In the following description, assume that the printing buffer has data of 600 dpi for 16 rasters in the main scanning direction, and the printing width is 8 inches.

Reference numeral 301 in FIG. 3A is a view for explaining printing in the first pass using the K (black) head. Reference numeral 302 in FIG. 3B is a view for explaining printing in the second pass using the K (black) head and color head. Reference numeral 303 in FIG. 3C is a view for explaining printing in the third pass using the K (black) head and color head.

In a K (black) buffer management area 304 in FIG. 3A, where printing buffers for K (black) data are managed, K (black) buffer management areas 304-1 to 304-9 are laid out in this order from the leading edge of printing paper.

The printing buffer has data of 600 dpi for 16 rasters in the main scanning direction. In this embodiment, since the printing width is 8 inches, the storage capacity per buffer is 16×8×600 bits.

There are 48 color buffers 1 to 48 (heads) and 10 K (black) buffers 49 to 58 (heads+gap). In the 48 color buffers, buffers 1 to 8 correspond to 128 light cyan nozzles, buffers 9 to 16 correspond to 128 light magenta nozzles, buffers 17 to 24 correspond to 128 yellow nozzles, buffers 25 to 32 correspond to 128 dark yellow nozzles, buffers 33 to 40 correspond to 128 dark magenta nozzles, and buffers 41 to 48 correspond to 128 dark cyan nozzles.

Referring to FIG. 3A, reference numeral 306 denotes a K (black) head in the first pass state; and 307, a color head in the first pass state. A printing result 308 indicates a state wherein printing in the first pass is ended, i.e., a state wherein printing by the 128 K (black) nozzles indicated by 306K is complete. In the first pass, printing is performed using only the K (black) head.

Referring to FIG. 3A, when printing by the 128 K (black) nozzles in the first pass is ended, the paper sheet is fed by the printed amount (corresponding to 128 nozzles) by LF operation 309. The printing paper sheet moves in a conveyance direction 320 by the printed amount (corresponding to 128 nozzles), and the state shifts to the second pass state 302 shown in FIG. 3B.

Referring to FIG. 3B, reference numeral 316 denotes a K (black) head in the second pass state; and 317, a color head in the second pass state. A printing result 318 indicates a state wherein printing in the second pass is ended, i.e., a state wherein printing by the 128 K (black) nozzles indicated by 316K in the second pass and printing by the 128 color nozzles indicated by 317 color in the second pass are complete. However, 306K (first pass) and 316K (second pass) in the printing result 318 indicate printing results using the K (black) head, and 307 color (second pass) in the printing result 318 indicates a result obtained by printing in the same printing range using the color heads of six colors. In addition, K and color in the printing result 318 indicates printing results in the same printing range. Although these portions actually overlap, they are illustrated side by side in FIG. 3A for the descriptive convenience. This also applies to FIGS. 3B and 3C. In the second pass, printing is performed using the K (black) head and color head.

Referring to FIG. 3B, when printing by the 128 K (black) nozzles and 128 color nozzles in the second pass is ended, the paper sheet is fed by the printed amount (corresponding to 128 nozzles) by LF operation 319. The printing paper sheet moves in a conveyance direction 321 by the printed amount (corresponding to 128 nozzles), and the state shifts to the third pass state 303 shown in FIG. 3C.

Referring to FIG. 3C, reference numeral 326 denotes a K (black) head in the third pass state; and 327, a color head in the third pass state. A printing result 328 indicates a state wherein printing in the third pass is ended, i.e., a state wherein printing by the 128 K (black) nozzles indicated by 326K in the third pass and printing by the 128 color nozzles indicated by 327 color in the third pass are complete.

Referring to FIG. 3C, when printing by the 128 K (black) nozzles and 128 color nozzles in the third pass is ended, the paper sheet is fed by the printed amount (corresponding to 128 nozzles) by LF operation 329. By repeating the above-described operations in FIGS. 3A to 3C, printing using the ink is performed on the printing paper sheet.

Control Flow of Printing Buffer

Figure 4:
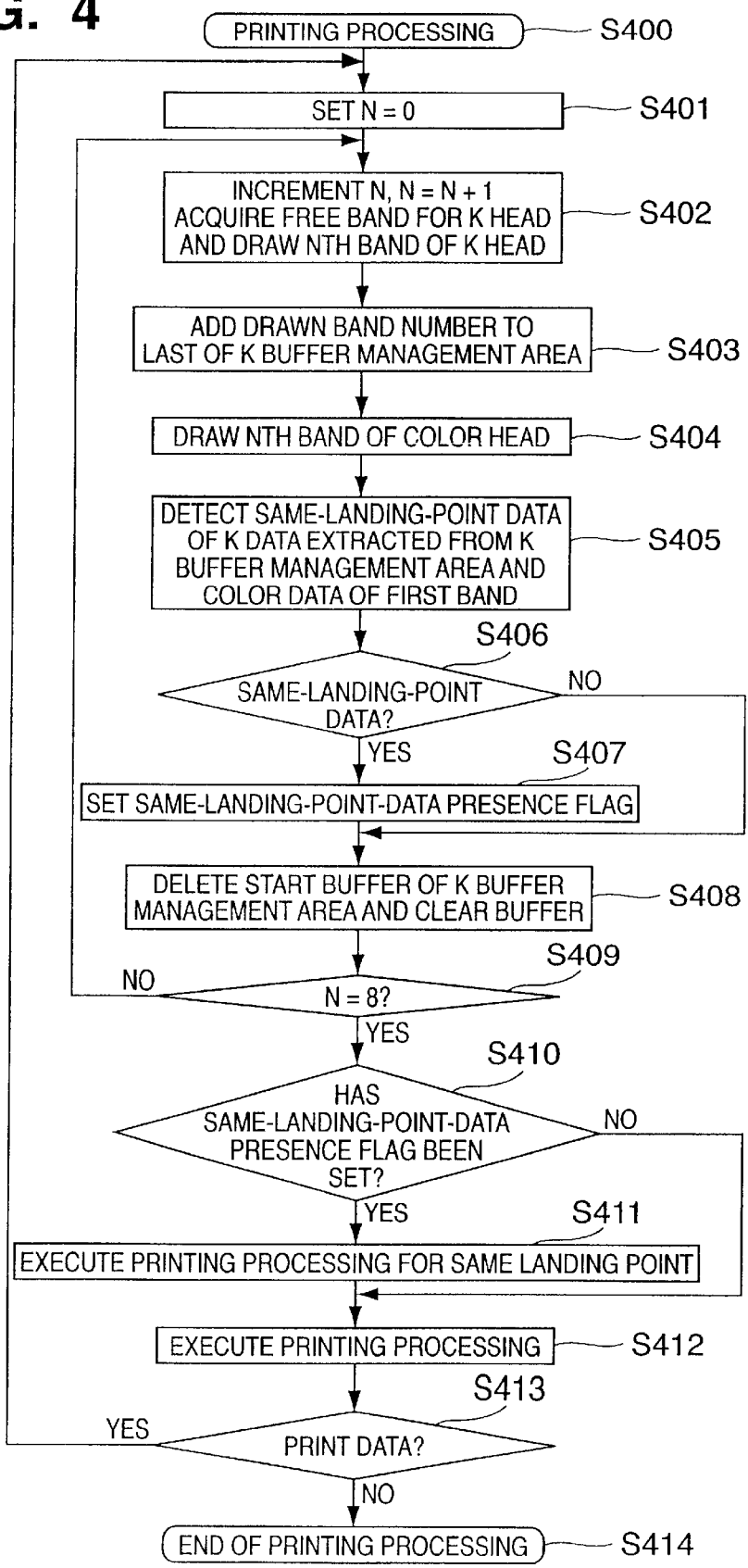
FIG. 4 is a flow chart showing the operation flow of the embodiment.

FIG. 4 shows the control flow of this embodiment. This will be described with reference to FIGS. 3A to 3C.

Printing starts in step S400.

In step S401, a counter N used to set the number of printing buffers to be assigned to the printing head is set. In the example shown in FIG. 4, N is always set to an initial value "0".

In step S402, N is incremented by one (N=N+1). After that, free buffers for the K (black) head are acquired, and the Nth band is drawn. At the start of printing, buffers 50 to 58 are always assigned to the K (black) buffer management area 304 shown in FIG. 3A, and they have been cleared. In this state, only K (black) buffer 49 is not in use. Additionally, in step S402, data is drawn and rasterized in buffer 49 of the K (black) head in the state 301 shown in FIG. 3A.

In step S403, printing buffer 49 in which data is drawn in step S402 is added to the last of the K (black) buffer management area 304 shown in FIG. 3A. At this time, the number of free buffers in the K (black) buffer management area becomes 0.

In step S404, the Nth band (first, N=1) of the color head 307 is drawn. In the state 301 shown in FIG. 3A, color data are drawn in buffers 1, 9, 17, 25, 33, and 41 of the color head 307. A color buffer is always drawn and rasterized at a predetermined position of the printing color head and automatically cleared when printing is ended.

In step S405, K data extracted from the K (black) buffer management area is compared with the color data of the first band to check whether data are present at the same landing point for the color data and K (black) data to be printed on the same raster as that of the color data. In the state 301, check is executed for buffer 50 in the K (black) buffer management area 304 and buffers 1, 9, 17, 25, 33, and 41 of the same row in FIG. 3A. To check whether data are present at the same landing point, it is determined for the buffer contents whether (K (black) buffer×(OR data of all color buffers)) is 0.

In step S406, if the result in step S405 is 0 (data are not present at the same landing point), the flow advances to step S408. If the result in step S405 is not 0, it is determined that data at the same landing point are present, and the flow advances to step S407. In step S407, a same-landing-point-data presence flag is set, and then, the flow advances to step S408.

In step S408, the start buffer in the K (black) buffer management area is cleared and deleted. With this processing, the number of free buffers for the K (black) head becomes 1. In the state 301 in FIG. 3A, buffer 50 for the band corresponding to the area 304-1 completes the same landing point detection processing in step S405. The buffer is deleted from the management area in step S408 and becomes the only free buffer.

In step S409, it is determined whether the counter N incremented in step S402 is 8. If N=8, 8×16 bits, i.e., data have been assigned to all 128 nozzles. The flow advances to step S410.

If it is determined in step S409 that N≠8, the flow returns to step S402 to increment the counter N (in this case, N=2). Then, the same drawing/rasterization processing as in the above-described case of N=1 is continued.

In step S410, it is confirmed whether the same-landing-point-data presence flag has been set. If the flag is set, printing processing for the same landing point is executed in step S411 to prevent any smearing, and the flow advances to step S412. In this embodiment, as an example of printing processing for the same landing point, wait processing for 3 sec is executed. Another method may be used for the printing processing for the same landing point as long as it can prevent any smearing.

If it is determined in step S410 that the same-landing-point-data presence flag has not been set, the flow directly advances to step S412.

In step S412, printing processing is executed. In printing processing, clearing the color printing buffers, resetting the same-landing-point-data presence flag, and paper feed operation by a printed amount are executed as well as printing the assigned buffers.

In step S413, it is determined whether next print data is present. If YES in step S413, the flow returns to step S401 to continue the same drawing control as described above.

If it is determined in step S413 that no print data is present, in step S414 printing operation ending processing such as buffer initialization and printing paper discharge is executed, and then, the series of printing processing operations are ended.

As described above, to prevent ink smearing that occurs when K (black) ink and color ink are printed at the same landing point, K (black) data of raster data transferred in a form corresponding to the printing head is temporarily stored. In printing color data on the same raster, it is determined whether color data to be printed at the same landing point as that of the K (black) data in the temporary storage area is present. If such color data is present, smearing preventing processing is executed to prevent any ink smearing.

That is, in this embodiment, data corresponding to only a printing portion of the head having a shift in advance is transferred. K (black) raster data transferred at this time is temporarily stored until printing of color data on the same raster is ended. In printing the temporarily stored color data, it is determined whether data to be landed at the same position as that of the K (black) data is present. If such data is present, predetermined smearing preventing processing is executed to prevent any ink smearing.

In the above example, preventing processing for ink smearing that occurs when K (black) ink and color ink are printed at the same landing point has been described. When ink smearing occurs at the boundary between K (black) ink and color ink printed at a landing point adjacent to the landing point of K (black) ink, the ink smearing can be similarly prevented by applying the above method.

In this case, K (black) data of raster data transferred in a form corresponding to the printing head is temporarily stored, as described above. In printing color data on the same raster, it is determined whether data to be printed at a landing point adjacent to the landing point of the K (black) data in the temporarily storage area is present. If such data is present, smearing preventing processing is executed to prevent any ink smearing.

As described above, the ink-jet printing apparatus of this embodiment can easily execute smearing preventing processing at low cost.

In the above embodiments, droplets discharged from the printhead are ink droplets, and a liquid stored in the ink tank is ink. However the liquid to be stored in the ink tank is not limited to ink.

For example, a treatment solution to be discharged onto a printing medium so as to improve the fixing property or water resistance of a printed image or its image quality may be stored in the ink tank.

Each of the embodiments described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of a so-called on-demand type and a continuous type system. Particularly, in the case of the on-demand type, the system is effective because, by applying at least one driving signal, which corresponds to printing information and gives a rapid temperature rise exceeding nucleate boiling, to each of electrothermal transducers arranged in correspondence with a sheet or liquid channels holding a liquid (ink), heat energy is generated by the electrothermal transducer to effect film boiling on the heat acting surface of the printing head, and consequently, a bubble can be formed in the liquid (ink) in one-to-one correspondence with the driving signal.

By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printing head, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printing head having a length corresponding to the width of a maximum printing medium which can be printed by the printer, either the arrangement which satisfies the full-line length by combining a plurality of printing heads as disclosed in the above specification or the arrangement as a single printing head obtained by forming printing heads integrally can be used.

In addition, not only an exchangeable chip type printing head, as described in the above embodiment, which can be electrically connected to the apparatus main unit and can receive an ink from the apparatus main unit upon being mounted on the apparatus main unit but also a cartridge type printing head in which an ink tank is integrally arranged on the printing head itself can be applicable to the present invention.

It is preferable to add recovery means for the printing head, preliminary auxiliary means, and the like provided as an arrangement of the printer of the present invention since the printing operation can be further stabilized. Examples of such means include, for the printing head, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printing head or by combining a plurality of printing heads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention.

In this case, as described in Japanese Patent laid Open No. 54-56847 or Japanese Patent Laid Open No. 60-71260, an ink may be supplied in a form of perforated sheet opposed to the electrothermal transducer in which the ink is maintained in liquid or solid within a dent or a through-hole thereon. In the present invention, the above-mentioned film boiling system is most effective for the above-mentioned inks.

In addition, the image printing apparatus according to the present invention can take a form of a copying machine combined with a reader or the like, or a facsimile apparatus having a transmission/reception function as well as a form of an integrated or separated image output terminal of an information processing device such as a computer.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program code for performing the aforesaid processes to a computer system or apparatus (e.g., a personal computer), reading the program code, by a CPU or MPU of the computer system or apparatus, from the storage medium, then executing the program. In this case, the program code read from the storage medium realize the functions according to the embodiments, and the storage medium storing the program code constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, additional functions according to the above embodiments are realized by executing the program code which is read by a computer. The present invention includes a case where an OS (operating system) or the like working on the computer performs a part of or an entire process in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, a CPU or the like contained in the function expansion card or function expansion unit performs a part of or an entire process in accordance with designations of the program code and realizes functions of the above embodiments.

When the present invention is applied to the storage medium, it stores program codes corresponding to the above-described flow chart (FIG. 4).

As has been described above, according to the present invention, an image printing apparatus and method can prevent any smearing that occurs in printing at the same landing position using nozzles of different colors with a smaller RAM capacity.

As many apparently widely different embodiments of the present invention can be made without departing from the spirit and scope thereof, it is to be understood that the invention is not limited to the specific embodiments thereof except as defined in the appended claims.

What is claimed is:

1. An image printing apparatus which causes a carriage having, for each of a plurality of inks, a printing head having a plurality of printing elements arrayed in a predetermined direction to scan on a printing medium in a direction perpendicular to the array direction of the printing elements, thereby forming a color image on the printing medium, comprising:

a reception buffer for storing print data transmitted in a raster format;

printing buffers for divisionally storing the data stored in said reception buffer for each ink and for each predetermined area to be printed by the printing head;

determination means for determining whether a designated printing buffer and an undesignated printing buffer in said printing buffers have data to be printed at the same position; and preventing means for, when it is determined that the data to be printed at the same position are present, preventing any ink smearing that occurs in printing at the same position.

2. The apparatus according to claim 1, wherein said plurality of divided printing buffers have information of different inks to form the color image and information of a distance between the inks.

3. The apparatus according to claim 1, wherein said designated printing buffer comprises printing buffers for a plurality of kinds of ink.

4. The apparatus according to claim 1, wherein said designated printing buffer comprises a printing buffer for K (black) ink and printing buffers for inks other than the K (black) ink.

5. The apparatus according to claim 1, wherein said determination means compares data representing whether each position is to be printed, which are stored in the designated printing buffer and the printing buffers other than the designated printing buffer, and when the data to be printed at the same position are present, sets a flag indicating that the data indicate the same position.

6. The apparatus according to claim 1, wherein said preventing means prevents the ink smearing by changing a timing of printing using each ink.

7. The apparatus according to claim 1, wherein said preventing means prevents the ink smearing by changing a timing of printing in continuously printing using ink other than the K (black) ink at the same position where printing has been executed using the K (black) ink of the inks.

8. The apparatus according to claim 1, wherein the printing head comprises an ink-jet printing head which prints by discharging ink.

9. The apparatus according to claim 8, wherein the printing head comprises a printing head which discharges ink using thermal energy and has a thermal energy transducer for generating the thermal energy to be applied to the ink.

10. An image printing method using an image printing apparatus which causes a carriage having, for each of a plurality of inks, a printing head having a plurality of printing elements arrayed in a predetermined direction to scan on a printing medium in a direction perpendicular to the array direction of the printing elements, thereby forming a color image on the printing medium, the image printing apparatus comprising:

a reception buffer for storing print data transmitted in a raster format; and printing buffers for divisionally storing the data stored in the reception buffer for each ink and for each predetermined area to be printed by the printing head; and the method comprising:

a determination step of determining whether a designated printing buffer and an undesignated printing buffer in the printing buffers have data to be printed at the same position; and a preventing step of, when it is determined that the data to be printed at the same position are present, preventing any ink smearing that occurs in printing at the same position.

11. The method according to claim 10, wherein the plurality of divided printing buffers have information of different inks to form the color image and information of a distance between the inks.

12. The method according to claim 10, wherein the designated printing buffer comprises printing buffers for a plurality of kinds of ink.

13. The method according to claim 10, wherein the designated printing buffer comprises a printing buffer for K (black) ink and printing buffers for inks other than the K (black) ink.

14. The method according to claim 10, wherein in the determination step, data representing whether each position is to be printed, which are stored in the designated printing buffer and the printing buffers other than the designated printing buffer, are compared, and when the data to be printed at the same position are present, a flag indicating that the data indicate the same position is set.

15. The method according to claim 10, wherein in the preventing step, the ink smearing is prevented by changing a timing of printing using each ink.

16. The method according to claim 10, wherein in the preventing step, the ink smearing is prevented by changing a timing of printing in continuously printing using ink other than the K (black) ink at the same position where printing has been executed using the K (black) ink of the inks.

17. The method according to claim 10, wherein the printing head comprises an ink-jet printing head which prints by discharging ink.

18. The method according to claim 17, wherein the printing head comprises a printing head which discharges ink using thermal energy and has a thermal energy transducer for generating the thermal energy to be applied to the ink.

19. A control program which controls an image printing method using an image printing apparatus which causes a carriage having, for each of a plurality of inks, a printing head having a plurality of printing elements arrayed in a predetermined direction to scan on a printing medium in a direction perpendicular to the array direction of the printing elements, thereby forming a color image on the printing medium, the image printing apparatus comprising:

a reception buffer for storing print data transmitted in a raster format; and printing buffers for divisionally storing the data stored in the reception buffer for each ink and for each predetermined area to be printed by the printing head; and the control method comprising:

a code of a determination step of determining whether a designated printing buffer and an undesignated printing buffer in the printing buffers have data to be printed at the same position; and a code of a preventing step of, when it is determined that the data to be printed at the same position are present, preventing any ink smearing that occurs in printing at the same position.

20. A computer-readable storage medium storing a control program which controls an image printing method using an image printing apparatus which causes a carriage having, for each of a plurality of inks, a printing head having a plurality of printing elements arrayed in a predetermined direction to scan on a printing medium in a direction perpendicular to the array direction of the printing elements, thereby forming a color image on the printing medium, the image printing apparatus comprising:

a reception buffer for storing print data transmitted in a raster format; and printing buffers for divisionally storing the data stored in the reception buffer for each ink and for each predetermined area to be printed by the printing head; and the control method comprising:

a code of a determination step of determining whether a designated printing buffer and an undesignated printing buffer in the printing buffers have data to be printed at the same position; and a code of a preventing step of, when it is determined that the data to be printed at the same position are present, preventing any ink smearing that occurs in printing at the same position.

* * * * *

UNITED STATES PATENT AND TRADEMARK OFFICE
CERTIFICATE OF CORRECTION

PATENT NO.   : 6,585,354 B2
DATED        : July 1, 2003
INVENTOR(S)  : Otani

It is certified that error appears in the above-identified patent and that said Letters Patent is hereby corrected as shown below:

Title page,
Item [56], References Cited, FOREIGN PATENT DOCUMENTS, "JP 54-56847 5/1989" should read -- JP 54-56847   5/1979 --.

Column 8,
Line 66, "bufferx(OR" should read -- buffer × (OR --.

Signed and Sealed this

Sixth Day of January, 2004

JAMES E. ROGAN
*Director of the United States Patent and Trademark Office*